United States Patent
Nakamura et al.

(10) Patent No.: US 11,506,817 B2
(45) Date of Patent: Nov. 22, 2022

(54) LIGHTING DAMAGE PREDICTION APPARATUS, METHOD, AND PROGRAM

(71) Applicant: NIPPON TELEGRAPH AND TELEPHONE CORPORATION, Tokyo (JP)

(72) Inventors: Naomichi Nakamura, Musashino (JP); Hidetoshi Takada, Musashino (JP); Nobue Aoki, Musashino (JP); Jun Kato, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/965,980

(22) PCT Filed: Feb. 1, 2019

(86) PCT No.: PCT/JP2019/003690
§ 371 (c)(1),
(2) Date: Jul. 29, 2020

(87) PCT Pub. No.: WO2019/151496
PCT Pub. Date: Aug. 8, 2019

(65) Prior Publication Data
US 2021/0033749 A1  Feb. 4, 2021

(30) Foreign Application Priority Data
Feb. 5, 2018 (JP) .............................. JP2018-018680

(51) Int. Cl.
*G01W 1/10* (2006.01)
*G06Q 50/06* (2012.01)

(52) U.S. Cl.
CPC .............. *G01W 1/10* (2013.01); *G06Q 50/06* (2013.01)

(58) Field of Classification Search
CPC ... G01W 1/00; G01W 2001/006; G01W 1/02; G01W 1/04; G01W 1/16; G01W 2203/00;
(Continued)

(56) References Cited

U.S. PATENT DOCUMENTS 6,828,911 B2 * 12/2004 Jones ...................... G01W 1/16
324/457
8,682,623 B1 * 3/2014 Domijan, Jr ............ G01W 1/06
703/2
(Continued)

FOREIGN PATENT DOCUMENTS

JP      200462521 A      2/2004
JP      2004062521 A  *  2/2004
(Continued)

OTHER PUBLICATIONS

Nobue Aoki, "Lightning protection technology that supports the diversification of network appliances." NTT R&D, Dec. 10, 2002. vol. 51, No. 12 (2002), pp. 991-995. Machine translation attached.

*Primary Examiner* — Daniel R Miller
*Assistant Examiner* — Eric Sebastian Von Wald

(57) ABSTRACT

A lightning damage prediction apparatus that predicts a risk of a failure of access equipment due to a lightning strike is provided. A regression equation representing a relationship between a lightning strike density for each section in a prediction target area, an equipment density for each section of components of a plurality of types constituting equipment, and a lightning damage failure density for each section of the equipment or the component, corresponding to a first period in the past, is generated, and a lightning damage failure density for each section of a prediction target area corresponding to a second period is predicted on the basis of a lightning strike density and an equipment density for each section in the prediction target area corresponding to the (Continued)

second period that is a prediction target, and the regression equation.

7 Claims, 29 Drawing Sheets

(58) Field of Classification Search
CPC ........ G06Q 50/06; G06Q 50/08; G06Q 50/26; G06Q 50/30; E04B 1/0007; E04B 1/08; E04B 1/14
See application file for complete search history.

(56) References Cited

U.S. PATENT DOCUMENTS

| | | | | |
|---|---|---|---|---|
| 9,217,811 | B1* | 12/2015 | Sweers | B64D 45/02 |
| 2005/0046574 | A1* | 3/2005 | Fabian | G08B 31/00 |
| | | | | 340/573.1 |
| 2018/0156941 | A1* | 6/2018 | Magnan | G01W 1/16 |

FOREIGN PATENT DOCUMENTS

| | | | |
|---|---|---|---|
| JP | 200815620 | A | 1/2008 |
| JP | 200915450 | A | 1/2009 |
| JP | 2012108766 | A | 6/2012 |
| JP | 2013114531 | A * | 6/2013 |
| JP | 5513348 | B2 * | 6/2014 |
| JP | 2017182371 | A | 10/2017 |

* cited by examiner

【 SPECIFY PERIOD 】

■ PERIOD FOR REGRESSION ANALYSIS (DERIVE REGRESSION COEFFICIENT USING DATA IN THIS PERIOD)

JANUARY 1, 2017 TO SEPTEMBER 1, 2017

■ PREDICTION TARGET PERIOD (DERIVE NUMBER OF LIGHTNING DAMAGE FAILURES USING DATA IN THIS PERIOD)

OCTOBER 1, 2017 TO DECEMBER 31, 2017

DETERMINE    CANCEL

Fig. 4A

|  | STARTING DATE | TERMINATION DATE |
|---|---|---|
| PERIOD FOR REGRESSION ANALYSIS | JANUARY 1, 2017 | SEPTEMBER 1, 2017 |
| PREDICTION TARGET PERIOD | OCTOBER 1, 2017 | DECEMBER 31, 2017 |

Fig. 4B

[MESH CELL SIZE, UNIT OF REGRESSION ANALYSIS, PREDICTION RESOLUTION (PREDICTION TARGET AREA) SETTING SCREEN]

■ MESH CELL SIZE (MESH CELL SIZE FOR DENSITY CALCULATION)
☑ 1 km MESH CELL
☑ 5 km MESH CELL
☐ PREFECTURAL REGION MESH CELL
☐ OTHER ([ ] km MESH CELL)

■ UNIT OF REGRESSION ANALYSIS (IN WHAT UNITS OF AREAS REGRESSION COEFFICIENT IS DERIVED)
☑ FOR EACH PREFECTURAL REGION
☐ WHOLE COUNTRY
☐ OTHER ([ ] km × [ ] km) (DERIVE REGRESSION COEFFICIENT IN ANY AREA)

■ PREDICTION RESOLUTION (PREDICTION TARGET AREA)
☐ 1 km MESH CELL (DERIVE NUMBER OF LIGHTNING DAMAGE FAILURES IN UNITS OF 1 km MESH CELL)
☐ 5 km MESH CELL (DERIVE NUMBER OF LIGHTNING DAMAGE FAILURES IN UNITS OF 5 km MESH CELL)
☑ PREFECTURAL REGION (DERIVE NUMBER OF LIGHTNING DAMAGE FAILURES IN UNITS OF PREFECTURES)
☐ WHOLE COUNTRY (DERIVE NUMBER OF LIGHTNING DAMAGE FAILURES IN JAPAN)
☐ OTHER ([ ] km × [ ] km)

[ DETERMINE ]   [ CANCEL ]

Fig. 5A

| MESH CELL SIZE | 1km, 5km |
|---|---|
| UNIT OF REGRESSION ANALYSIS | PREFECTURAL REGION |
| PREDICTION RESOLUTION (PREDICTION TARGET AREA) | PREFECTURAL REGION |

Fig. 5B

| PREFECTURES | NUMBER | MINIMUM LATITUDE [DEGREES] | MINIMUM LONGITUDE [DEGREES] | MAXIMUM LATITUDE [DEGREES] | MAXIMUM LONGITUDE [DEGREES] |
|---|---|---|---|---|---|
| GUNMA PREFECTURE | G-1 | 35.ggggg | 139.ggggg | 35.ggggg | 139.ggggg |
| | G-2 | 35.hhhhh | 139.hhhhh | 35.hhhhh | 139.hhhhh |
| | G-3 | 35.iiiii | 139.iiiii | 35.iiiii | 139.iiiii |
| | ⋮ | ⋮ | ⋮ | ⋮ | ⋮ |
| | G-30 | 35.nnnnn | 139.nnnnn | 35.nnnnn | 139.nnnnn |
| TOKYO | T-1 | 35.ttttt | 139.ttttt | 35.ttttt | 139.ttttt |
| | T-2 | 35.uuuuu | 139.uuuuu | 35.uuuuu | 139.uuuuu |
| | T-3 | 35.vvvvv | 139.vvvvv | 35.vvvvv | 139.vvvvv |
| | ⋮ | ⋮ | ⋮ | ⋮ | ⋮ |
| | T-60 | 35.zzzzz | 139.zzzzz | 35.zzzzz | 139.zzzzz |
| ⋮ | ⋮ | ⋮ | ⋮ | ⋮ | ⋮ |

Fig. 6A

| PREFECTURES | NUMBER | MINIMUM LATITUDE [DEGREES] | MINIMUM LONGITUDE [DEGREES] | MAXIMUM LATITUDE [DEGREES] | MAXIMUM LONGITUDE [DEGREES] |
|---|---|---|---|---|---|
| GUNMA PREFECTURE | G-1 | 35.gggggg | 139.gggggg | 35.gggggg | 139.gggggg |
| | G-2 | 35.hhhhhh | 139.hhhhhh | 35.hhhhhh | 139.hhhhhh |
| | G-3 | 35.iiiiii | 139.iiiiii | 35.iiiiii | 139.iiiiii |
| | ⋮ | ⋮ | ⋮ | ⋮ | ⋮ |
| | G-30 | 35.nnnnnn | 139.nnnnnn | 35.nnnnnn | 139.nnnnnn |
| TOKYO | T-1 | 35.tttttt | 139.tttttt | 35.tttttt | 139.tttttt |
| | T-2 | 35.uuuuuu | 139.uuuuuu | 35.uuuuuu | 139.uuuuuu |
| | T-3 | 35.vvvvvv | 139.vvvvvv | 35.vvvvvv | 139.vvvvvv |
| | ⋮ | ⋮ | ⋮ | ⋮ | ⋮ |
| | T-60 | 35.zzzzzz | 139.zzzzzz | 35.zzzzzz | 139.zzzzzz |
| ⋮ | ⋮ | ⋮ | ⋮ | ⋮ | ⋮ |

Fig. 6B

| G-1 | G-2 | G-3 | G-4 | |
|---|---|---|---|---|
| | | | | |
| | | | | |
| | | | | |
| | | | | |
| | | | | G-30 |

Fig. 6D

[ EQUIPMENT DESIGNATION SCREEN FOR REGRESSION ANALYSIS ]

EQUIPMENT ITEM

☐ COMMUNICATION CABLE ▼

☐ CABLE SUPPORT LINE ▼

☑ ELECTRICAL POLE ▼

☐ CONNECTION TERMINAL BOX ▼

☐ MANHOLE ▼

[ ADD ITEM ]  [ DELETE ITEM ]  [ DETERMINE ]  [ CANCEL ]

Fig. 7

| DATE AND TIME | | POSITION | | ENERGY | REMARKS |
| --- | --- | --- | --- | --- | --- |
| DATE | TIME | LATITUDE | LONGITUDE | CURRENT [A] | |
| 2017/mm/dd | tt:tt:tt | 35.aaaaaa | 139.aaaaaa | 30 | |
| 2017/mm/dd | tt:tt:tt | 35.bbbbbb | 139.bbbbbb | 100 | CLOUDY |
| 2017/mm/dd | tt:tt:tt | 35.cccccc | 139.cccccc | 20 | |
| 2017/mm/dd | tt:tt:tt | 35.dddddd | 139.dddddd | 30 | CLOUDY |
| 2017/mm/dd | tt:tt:tt | 35.eeeeee | 139.eeeeee | 40 | |
| 2017/mm/dd | tt:tt:tt | 35.ffffff | 139.ffffff | 60 | |

Fig. 8

| DATE | TIME | PREFECTURES | LATITUDE | LONGITUDE | EQUIPMENT INFORMATION |
|---|---|---|---|---|---|
| 2017/mm/dd | tt:tt:tt | TOKYO | 35.aaaaaa | 139.aaaaaa | ELECTRICAL POLE |
| 2017/mm/dd | tt:tt:tt | TOKYO | 35.bbbbbb | 139.bbbbbb | COMMUNICATION CABLE |
| 2017/mm/dd | tt:tt:tt | TOKYO | 35.cccccc | 139.cccccc | ELECTRICAL POLE |
| 2017/mm/dd | tt:tt:tt | TOKYO | 35.dddddd | 139.dddddd | MANHOLE |
| 2017/mm/dd | tt:tt:tt | GUNMA | 35.eeeeee | 139.eeeeee | COMMUNICATION CABLE |
| 2017/mm/dd | tt:tt:tt | GUNMA | 35.ffffff | 139.ffffff | CABLE SUPPORT LINE |

Fig. 9A

| DATE | TIME | PREFECTURES | MUNICIPALITIES | EQUIPMENT INFORMATION |
|---|---|---|---|---|
| 2017/mm/dd | tt:tt:tt | TOKYO | ○○ CITY ○○ TOWN ○○ STREET | ELECTRICAL POLE |
| 2017/mm/dd | tt:tt:tt | TOKYO | ○○ CITY △△ TOWN △△ STREET | COMMUNICATION CABLE |
| 2017/mm/dd | tt:tt:tt | TOKYO | ○○ CITY ○○ TOWN △ STREET | ELECTRICAL POLE |
| 2017/mm/dd | tt:tt:tt | TOKYO | ○○ CITY △ TOWN ○ STREET | MANHOLE |
| 2017/mm/dd | tt:tt:tt | GUNMA | □□ CITY ○○ TOWN ○ STREET | COMMUNICATION CABLE |
| 2017/mm/dd | tt:tt:tt | GUNMA | △△ CITY △△ TOWN △△ STREET | CABLE SUPPORT LINE |

Fig. 9B

| DATE | TIME | PREFECTURES | MINIMUM LONGITUDE [DEGREES] | MAXIMUM LATITUDE [DEGREES] | MAXIMUM LONGITUDE [DEGREES] | MAXIMUM LONGITUDE [DEGREES] | EQUIPMENT INFORMATION ELECTRICAL POLE (NUMBER) | EQUIPMENT INFORMATION CABLE LENGTH [m] | EQUIPMENT INFORMATION SUPPORT LINE LENGTH [m] |
|---|---|---|---|---|---|---|---|---|---|
| 2017/mm/dd | tt:tt:tt | TOKYO | 35.xxxxxx | 139.xxxxxx | 35.xxxxxx | 139.xxxxxx | 20 | 2000 | 2000 |
| 2017/mm/dd | tt:tt:tt | TOKYO | 35.yyyyyy | 139.yyyyyy | 35.yyyyyy | 139.yyyyyy | 5 | 500 | 500 |
| 2017/mm/dd | tt:tt:tt | TOKYO | 35.zzzzzz | 139.zzzzzz | 35.zzzzzz | 139.zzzzzz | 10 | 1000 | 1000 |

Fig. 9C

| DATE | TIME | PREFECTURES | LATITUDE | LONGITUDE | LIGHTNING DAMAGE FAILURE INFORMATION |
|---|---|---|---|---|---|
| 2017/mm/dd | tt:tttt | TOKYO | 35.aaaaaa | 139.aaaaaa | ACCESS EQUIPMENT |
| 2017/mm/dd | tt:tttt | TOKYO | 35.bbbbbb | 139.bbbbbb | ACCESS EQUIPMENT |
| 2017/mm/dd | tt:tttt | GUNMA | 35.cccccc | 139.cccccc | ACCESS EQUIPMENT |

Fig. 10A

| DATE | TIME | PREFECTURES | MUNICIPALITIES | LIGHTNING DAMAGE FAILURE INFORMATION |
|---|---|---|---|---|
| 2017/mm/dd | tt:tttt | TOKYO | ○○ CITY ○○ TOWN ○ STREET | ACCESS EQUIPMENT |
| 2017/mm/dd | tt:tttt | TOKYO | △△ CITY △△ TOWN △ STREET | ACCESS EQUIPMENT |
| 2017/mm/dd | tt:tttt | GUNMA | □□ CITY □□ TOWN □ STREET | ACCESS EQUIPMENT |

Fig. 10B

| DATE | TIME | PREFECTURES | LATITUDE | LONGITUDE | LIGHTNING DAMAGE FAILURE INFORMATION |
|---|---|---|---|---|---|
| 2017/mm/dd | tt:tt:tt | TOKYO | 35.aaaaaa | 139.aaaaaa | COMMUNICATION CABLE |
| 2017/mm/dd | tt:tt:tt | TOKYO | 35.bbbbbb | 139.bbbbbb | CABLE SUPPORT LINE |
| 2017/mm/dd | tt:tt:tt | GUNMA | 35.cccccc | 139.cccccc | ELECTRICAL POLE |

Fig. 10C

| DATE | TIME | PREFECTURES | MUNICIPALITIES | LIGHTNING DAMAGE FAILURE INFORMATION |
|---|---|---|---|---|
| 2017/mm/dd | tt:tt:tt | TOKYO | ○○ CITY ○○ TOWN ○ STREET | COMMUNICATION CABLE |
| 2017/mm/dd | tt:tt:tt | TOKYO | △△ CITY △△ TOWN △ STREET | CABLE SUPPORT LINE |
| 2017/mm/dd | tt:tt:tt | GUNMA | □□ CITY □□ TOWN □ STREET | ELECTRICAL POLE |

Fig. 10D

| PREFECTURES | MINIMUM LATITUDE [DEGREES] | MINIMUM LONGITUDE [DEGREES] | MAXIMUM LATITUDE [DEGREES] | MAXIMUM LONGITUDE [DEGREES] | LIGHTNING DAMAGE FAILURE INFORMATION ELECTRICAL POLE (NUMBER) | LIGHTNING DAMAGE FAILURE INFORMATION CABLE LENGTH [m] | LIGHTNING DAMAGE FAILURE INFORMATION SUPPORT LINE LENGTH [m] |
|---|---|---|---|---|---|---|---|
| TOKYO | 35.xxxxxx | 139.xxxxxx | 35.xxxxxx | 139.xxxxxx | 20 | 2000 | 2000 |
| TOKYO | 35.yyyyyy | 139.yyyyyy | 35.yyyyyy | 139.yyyyyy | 5 | 500 | 500 |
| TOKYO | 35.zzzzzz | 139.zzzzzz | 35.zzzzzz | 139.zzzzzz | 10 | 1000 | 1000 |

Fig. 10E

| PREFECTURES | NUMBER | MINIMUM LATITUDE [DEGREES] | MINIMUM LONGITUDE [DEGREES] | MAXIMUM LATITUDE [DEGREES] | MAXIMUM LONGITUDE [DEGREES] | LIGHTNING STRIKE DENSITY [NUMBER OF TIMES/km²] | EQUIPMENT DENSITY [NUMBER/km²] | LIGHTNING DAMAGE FAILURE DENSITY [NUMBER OF TIMES] | REGRESSION COEFFICIENT | |
|---|---|---|---|---|---|---|---|---|---|---|
| | | | | | | | | | PREDICTION COEFFICIENT (A) | PREDICTION INDEX (B) |
| GUNMA PREFECTURE | G-1 | 35.ggggg | 139.ggggg | 35.ggggg | 139.ggggg | 10 | 10 | 10 | 0.0598 | 0.6197 |
| | G-2 | 35.hhhhh | 139.hhhhh | 35.hhhhh | 139.hhhhh | 12 | 12 | 12 | | |
| | G-3 | 35.iiiii | 139.iiiii | 35.iiiii | 139.iiiii | 8 | 20 | 4 | | |
| | ... | ... | ... | ... | ... | ... | ... | ... | | |
| | G-30 | 35.nnnnn | 139.nnnnn | 35.nnnnn | 139.nnnnn | xx | xx | ... | | |
| TOKYO | T-1 | 35.ttttt | 139.ttttt | 35.ttttt | 139.ttttt | xx | xx | xx | 0.0888 | 0.5331 |
| | T-2 | 35.uuuuu | 139.uuuuu | 35.uuuuu | 139.uuuuu | xx | xx | xx | | |
| | T-3 | 35.vvvvv | 139.vvvvv | 35.vvvvv | 139.vvvvv | xx | xx | xx | | |
| | ... | ... | ... | ... | ... | ... | ... | ... | | |
| | T-60 | 35.zzzzz | 139.zzzzz | 35.zzzzz | 139.zzzzz | xx | xx | xx | | |
| ... | ... | ... | ... | ... | ... | ... | ... | ... | | |

Fig. 12

[ PREDICTION TARGET EQUIPMENT DESIGNATION ]

☑ ELECTRICAL POLE ▼

☐ COMMUNICATION CABLE ▼

☐ CONNECTION TERMINAL BOX ▼

ADD ITEM | DELETE ITEM | DETERMINE | CANCEL

Fig. 13

[LIGHTNING DAMAGE RISK LEVEL SETTING]

| SELECT | SELECT | FAILURE DENSITY [NUMBER OF TIMES/km$^2$] |
|---|---|---|
| ☐ | 1 | 0~99 |
| ☐ | 2 | 100~199 |
| ☐ | 3 | 200~299 |
| ☐ | 4 | 300~399 |
| ☐ | 5 | 400~MAXIMUM VALUE |
| ☑ | | |

ADD   DELETE   IMPORT   CANCEL

Fig. 14A

| NUMBER | FAILURE DENSITY | | LEVEL | UNIT |
| --- | --- | --- | --- | --- |
| | SECTION MINIMUM VALUE | SECTION MAXIMUM VALUE | | |
| EXAMPLE 1 | 0 | 99 | LEVEL 1 | NUMBER OF TIMES/km$^2$ |
| | 100 | 199 | LEVEL 2 | NUMBER OF TIMES/km$^2$ |
| | 200 | 299 | LEVEL 3 | NUMBER OF TIMES/km$^2$ |
| | 300 | 399 | LEVEL 4 | NUMBER OF TIMES/km$^2$ |
| | 400 | MAXIMUM VALUE | LEVEL 5 | NUMBER OF TIMES/km$^2$ |

Fig. 14B

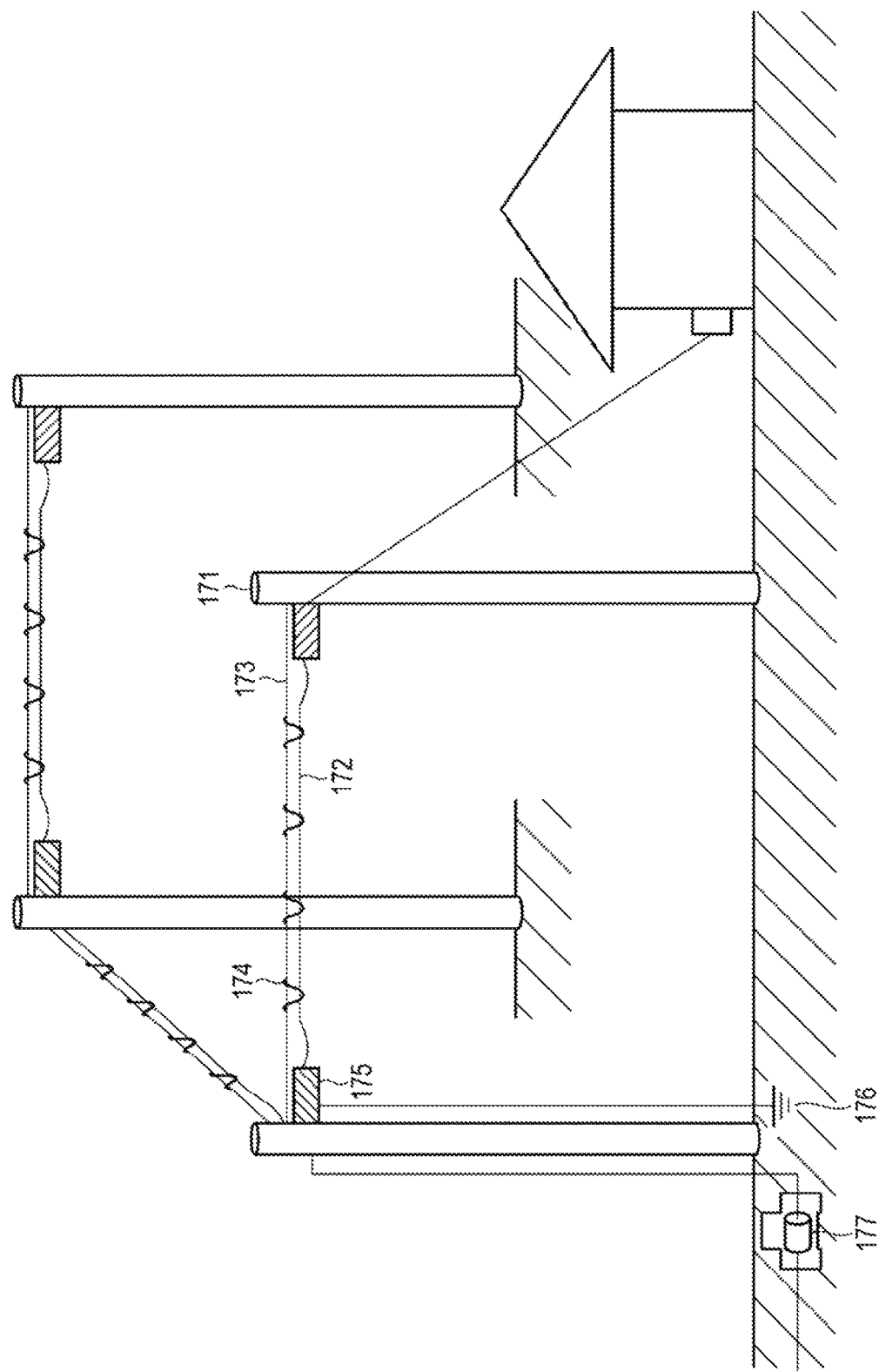

LIGHTING DAMAGE PREDICTION APPARATUS, METHOD, AND PROGRAM

CROSS-REFERENCE TO RELATED APPLICATIONS

This application is a 371 U.S. National Phase of International Application No. PCT/JP2019/003690, filed on Feb. 1, 2019, which claims priority to Japanese Application No. 2018-018680, filed on Feb. 5, 2018. The entire disclosures of the above applications are incorporated herein by reference.

TECHNICAL FIELD

An aspect of the present disclosure relates to a lightning damage prediction apparatus, method and program for predicting the risk of equipment failure due to lightning strikes.

BACKGROUND ART

In the related art, a technique for predicting a failure caused by lightning strikes (hereinafter, referred to as a "lightning damage failure") from the number of lightning strikes in a particular area, the number of apparatuses installed, and the number of apparatuses that have failed due to lightning strikes is known (see, for example, Patent Literatures 1, 2, or 3). Furthermore, a technique for improving the accuracy of prediction of a lightning damage failure by taking into account the lightning surge resistance of a prediction target apparatus and the magnitude of a lightning strike is known (see, for example, Patent Literature 4 or 5).

CITATION LIST

Patent Literature

Patent Literature 1: Japanese Unexamined Patent Application Publication No. 2004-062521
Patent Literature 2: Japanese Unexamined Patent Application Publication No. 2008-015620
Patent Literature 3: Japanese Unexamined Patent Application Publication No. 2009-015450
Patent Literature 4: Japanese Unexamined Patent Application Publication No. 2012-108766
Patent Literature 5: Japanese Unexamined Patent Application Publication No. 2013-114531

SUMMARY OF THE INVENTION

Technical Problem

In the related art, in order to predict a lightning damage failure, data regarding lightning damage failure of prediction target apparatuses (for example, the date and time when a lightning damage failure has occurred, the number of apparatuses that have failed, and a position where a failure has occurred), and equipment data of the apparatuses (for example, installation positions, the number of apparatuses installed, and the like) are required, in addition to data regarding lightning strikes. For example, in a case where the prediction of a lightning damage failure of a communication apparatus A is performed, lightning damage failure data of the communication apparatus A and equipment data of the communication apparatus A are required.

However, equipment in which a lightning damage failure occurs includes various components such as communication cables, cable support lines, and electrical poles (hereinafter, collectively referred to as "equipment" or "access equipment"). FIG. 17 illustrates an example of various components that constitute access equipment, and for example, the access equipment includes an electrical pole 171, a communication cable 172, a cable support line 173, a cable ring 174, a connection terminal box 175, a ground electrode 176, and a manhole 177. In a case of attempting to predict a lightning damage failure for the entire access equipment including such various components, it is difficult to apply the related art for the following reasons.

That is, in a case where a lightning damage failure of a specific communication apparatus is predicted, the name of an apparatus that has failed and the position where a failure has occurred can be clearly identified, and thus it is possible to acquire equipment data and lightning damage failure data necessary for the prediction. However, in a case where a lightning damage failure of access equipment including various components is predicted as described above, it is not easy to clearly determine equipment data and lightning damage failure data of which component should be used. Further, generally, in a case where a lightning damage failure of access equipment occurs, detailed information of the location of a failure having occurred in the access equipment is not collected because a recovery operation is prioritized, or the identification of a position of failure occurrence and details of failed equipment are not clear in many cases because the construction area is large. Thus, there is a problem that sufficient lightning damage failure data for each component are not collected.

The invention is contrived in view of the above-described circumstances, and an object of the invention is to provide a lightning damage prediction apparatus, method, and program which make it possible to predict the risk of a lightning damage failure of access equipment even when details of a lightning damage failure of the access equipment are unknown.

Means for Solving the Problem

In order to solve the above-described problems, according to a first aspect of the disclosure, there is provided a lightning damage prediction apparatus for acquiring data from a lightning strike data storage unit that stores lightning strike data including a position of occurrence of a lightning strike and a date and time of occurrence; an equipment data storage unit that stores equipment data representing a property of each of a plurality of types of components constituting equipment; a failure data storage unit that stores failure data representing a history of failures having occurred in the equipment or each of the components of the equipment due to the lightning strike; and a section data storage unit that stores section data including positional information of each of a plurality of sections obtained by dividing a prediction target area, the lightning damage prediction apparatus including a regression equation generation unit configured to generate a regression equation representing a relationship between a lightning damage failure density for each section in the prediction target area corresponding to a first period and a lightning strike density and an equipment density based on the failure data and the section data using, as variables, the lightning strike density for each section in the prediction target area corresponding to the first period in the past based on the lightning strike data and the section data and the equipment density for each section in the prediction target area corresponding to the first period based on the equipment data and the section data, a prediction variable acquisition unit that acquires a lightning strike density and an equipment density for each section in the prediction target area corresponding to a second period that is a prediction target, and a prediction unit configured to predict a lightning damage failure density for each section in the prediction target area corresponding to the second period on the basis of the acquired lightning strike density and equipment density and the regression equation.

According to a second aspect of the disclosure, the failure data storage unit may store, as the failure data, at least one of the number of failures, which occurs in the equipment due to a lightning strike, for each type of component, or an extent of damage for each type of component, and the regression equation generation unit is configured to obtain a lightning damage failure density for each section in the prediction target area corresponding to the first period, on the basis of at least one of the number of failures having occurred for each type of component of the equipment or the extent of damage for each type of component, which are stored as the failure data, and the section data.

According to a third aspect of the disclosure, the lightning damage prediction apparatus may further include a ranking processing unit configured to impart a risk rank representing a risk level of occurrence of a lightning damage failure in a specified section in the prediction target area on the basis of the predicted lightning damage failure density for each section in the prediction target area.

According to a fourth aspect of the disclosure, the lightning damage prediction apparatus may further include a mapping processing unit configured to create a map including the specified section on the basis of the section data and display, in association with a corresponding section on the map, an index representing a risk rank imparted to the specified section.

According to a fifth aspect of the disclosure, the mapping processing unit may include a determination unit configured to determine whether the risk rank is higher than a predetermined threshold value for each of the sections, and a display data generation unit configured to generate display data for displaying an index representing a type of component of equipment having a risk of occurrence of a failure in association with a corresponding section on the map in a case where it is determined that the risk rank is higher than the threshold value.

According to a sixth aspect of the disclosure, the lightning damage prediction apparatus may further include an updating unit configured to update, by a machine learning process, at least one of the first period, the prediction target area, and a size of each of the sections which are used to generate the regression equation, a type of component used for calculation of the equipment density, or a type of component used for calculation of the lightning damage failure density.

Effects of the Invention

According to the first aspect of the disclosure, a regression equation is generated that represents a relationship between a lightning strike density and equipment density for each section in a prediction target area corresponding to a first period in the past, and a lightning damage failure density for each section. Then, a lightning damage failure density for each section in a prediction target area corresponding to a second period is predicted on the basis of a lightning strike density and an equipment density for each section in the prediction target area corresponding to the second period that is a prediction target, and the regression equation. Thus, even when details of a lightning damage failure of the access equipment are unknown, it is possible to predict a section where there is a high risk of occurrence of a lightning damage failure in the entire access equipment by using available information only, and to efficiently perform preventive maintenance for lightning damage failure of the access equipment.

According to the second aspect of the disclosure, a lightning damage failure density for each section is acquired by a regression equation generation unit on the basis of at least one of the number of failures having occurred for each of the types of components of equipment or the extent of failure occurrence for each of the types of the components as failure data and section data. Thus, even when details of a lightning damage failure of access equipment are unknown, and particularly, even when sufficient failure data for each of types of components has not been collected, it is possible to predict a section having a high risk of occurrence of a lightning damage failure in the entire access equipment by more effectively using available information.

According to the third aspect of the disclosure, a risk rank representing the risk level of occurrence of a lightning damage failure is imparted to a specified section on the basis of a predicted lightning damage failure density for each section. Thus, it is possible to easily extract a section having a high risk of occurrence of a lightning damage failure of access equipment using available information only, and to more rapidly perform preventive maintenance for a lightning damage failure of the access equipment.

According to the fourth aspect of the disclosure, a map including a specified section is created, and an index representing the imparted risk rank is displayed in association with a corresponding section on the map. Thus, it is possible to visually identify a section having a high risk of occurrence of a lightning damage failure among specified sections.

According to the fifth aspect of the disclosure, it is determined whether a risk rank is higher than a predetermined threshold value for each section and in a case where it is determined that the risk rank is higher than the threshold value, an index representing the type of component of equipment having a risk of occurrence of a failure is displayed in association with a corresponding section on a map. Thus, an administrator can easily recognize equipment in need of a countermeasure in a section having a high risk of occurrence of a lightning damage failure among specified sections.

According to the sixth aspect of the disclosure, at least one of a first period, a prediction target area, and the size of each of sections which are used to generate a regression equation, the types of components used to calculate an equipment density, or the types of components used to calculate a lightning damage failure density is updated by a machine learning process. Thus, it is possible to perform regression analysis and prediction using conditions that result in higher prediction accuracy which are updated constantly.

That is, according to the aspects of the disclosure, it is possible to provide a lightning damage prediction apparatus, method, and program which make it possible to predict the risk of a lightning damage failure of access equipment even when details of a lightning damage failure of the access equipment are not known.

BRIEF DESCRIPTION OF DRAWINGS

FIG. 4A is a diagram illustrating an example of a screen image for specifying a target period for regression analysis and a target period for prediction.

FIG. 4B is a diagram illustrating an example of a specified target period for regression analysis and a specified target period for prediction.

FIG. 5A is a diagram illustrating an example of a screen image for specifying a mesh cell size used for density calculation, a target area for regression analysis, and a target area for prediction.

FIG. 5B is a diagram illustrating an example of a specified mesh cell size, a specified target area for regression analysis, and a specified target area for prediction.

FIG. 6A is a diagram illustrating an example of section data indicating positional information of a 1 km mesh stored in a section data storage unit.

FIG. 6B is a diagram illustrating an example of section data indicating positional information of a 5 km mesh cell stored in a section data storage unit.

FIG. 6D is a diagram illustrating an example of identification numbers imparted to a mesh cell.

FIG. 7 is a diagram illustrating an example of a screen image for specifying details of equipment used for density calculation in regression analysis.

FIG. 8 is a diagram illustrating an example of lightning strike data stored in a lightning strike data storage unit.

FIG. 9A is a diagram illustrating an example of equipment data stored in an equipment data storage unit.

FIG. 9B is a diagram illustrating another example of equipment data stored in an equipment data storage unit.

FIG. 9C is a diagram illustrating another example of equipment data stored in an equipment data storage unit.

FIG. 10A is a diagram illustrating an example of failure data stored in a failure data storage unit.

FIG. 10B is a diagram illustrating another example of failure data stored in a failure data storage unit.

FIG. 10C is a diagram illustrating another example of failure data stored in a failure data storage unit.

FIG. 10D is a diagram illustrating another example of failure data stored in a failure data storage unit.

FIG. 10E is a diagram illustrating another example of failure data stored in a failure data storage unit.

FIG. 12 is a diagram illustrating an example of section data stored in a section data storage unit, and the section data includes acquired lightning strike densities, equipment densities, and lightning damage failure densities and derived regression coefficients.

FIG. 13 is a diagram illustrating an example of a screen image for determining details of equipment to be used for density calculation in prediction.

FIG. 14A is a diagram illustrating an example of an image of a details setting screen for imparting a risk rank to a predicted failure density.

FIG. 14B is a diagram illustrating an example of a determined risk rank.

FIG. 17 is a diagram illustrating an example of various components constituting access equipment.

DESCRIPTION OF EMBODIMENTS

Embodiments according to the disclosure will be described below with reference to the drawings.

Embodiment

Configuration

Figure 1:
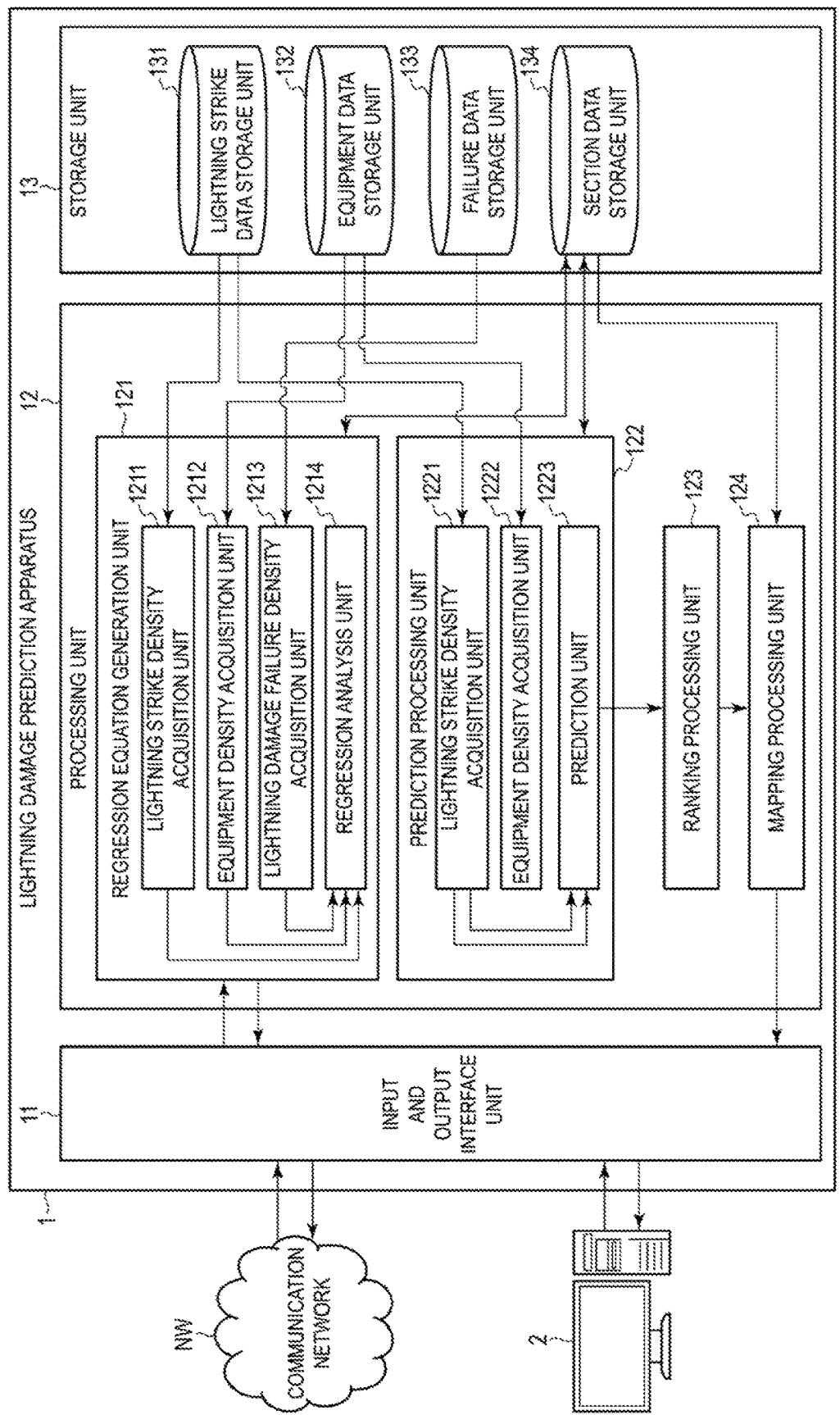
FIG. 1 is a block diagram illustrating a functional configuration of a system including a lightning damage prediction apparatus according to an embodiment of the disclosure.

FIG. 1 is a block diagram illustrating a functional configuration of a system including a lightning damage prediction apparatus according to an embodiment of the disclosure. The system includes a lightning damage prediction apparatus 1 and a user terminal 2 which can communicate with each other via a communication network NW.

The communication network NW is constituted by an Internet protocol (IP) network represented by, for example, the Internet, and a plurality of access networks for accessing the IP network. As the access network, not only a wired network using optical fibers but also a mobile phone network operating in conformity with standards such as 3G or 4G, a wireless local area network (LAN), or the like is used.

The user terminal 2 is, for example, a personal computer used by a user such as an administrator of an apparatus, and is used to specify various parameters or to input data sets. In addition, the user terminal 2 is also used as an output destination of prediction results or mapping results acquired by the lightning damage prediction apparatus 1, which will be described later. However, the user terminal 2, which is not an essential component, can be integrated with the lightning damage prediction apparatus 1 and can also be omitted.

The lightning damage prediction apparatus 1 is constituted by, for example, a personal computer or a server apparatus, and includes an input/output interface unit 11, a processing unit 12, and a storage unit 13.

The input/output interface unit 11 includes, for example, a wired or wireless interface, and allows information to be transmitted and received to and from an external device, for example, the user terminal 2, or to and from an external server, an external database, or the like via the communication network NW. For example, a wired LAN is used as the wired interface, and an interface adopting a small power wireless data communication standard, such as Bluetooth (registered trademark), is used as the wireless interface.

The storage unit 13 uses a non-volatile memory which enables writing and reading at any time, such as a hard disk drive (HDD) or a solid state drive (SSD) as a storage medium. In addition, the storage unit 13 includes, as storage regions required to realize this embodiment, a lightning strike data storage unit 131, an equipment data storage unit 132, a failure data storage unit 133, and a section data storage unit 134 in addition to the program storage unit.

The lightning strike data storage unit 131 stores lightning strike data including information such as the position of occurrence of a lightning strike, the date and time of occurrence of a lightning strike, and the energy (for example, a current value) of a lightning strike. The equipment data storage unit 132 stores equipment data including information representing the position and type of each of components of a plurality of types constituting access equipment. The failure data storage unit 133 stores failure data including information representing a history of failures (the dates and times of occurrence of failures, the positions of occurrence of failures, the name of failed equipment, and the like) which have occurred in the equipment or the components of the equipment due to a lightning strike. The section data storage unit 134 stores section data including positional information of sections for dividing a target area, for which a lightning damage failure prediction is desired, into a plurality of sections in the form of a mesh (hereinafter, also referred to as a "mesh cell"). The above-described lightning strike data, equipment data, failure data, and section data may be input manually by a user through the user terminal 2 or the like, or may be imported from a file or the like. Meanwhile, the lightning strike data storage unit 131, the equipment data storage unit 132, the failure data storage unit 133, and the section data storage unit 134 may not necessarily be built into the lightning damage prediction apparatus 1, or may be provided in an external storage apparatus such as a database server allocated on the cloud. In this case, the lightning damage prediction apparatus 1 acquires and uses necessary data by accessing the database server of the cloud via the communication network NW.

The processing unit 12 includes a hardware processor, such as a central processing unit (CPU) which is not illustrated in the drawing, and a memory. Furthermore, as a processing function required to implement this embodiment, a regression equation generation unit 121, a prediction processing unit 122, a ranking processing unit 123, and a mapping processing unit 124 are included. These processing functions are achieved by causing the hardware processor to execute programs stored in the memory.

The regression equation generation unit 121 includes a lightning strike density acquisition unit 1211, an equipment density acquisition unit 1212, a lightning damage failure density acquisition unit 1213, and a regression analysis unit 1214.

The lightning strike density acquisition unit 1211 acquires a frequency at which a lightning strike has occurred over a predetermined first period in the past (hereinafter, referred to as a "lightning strike density") for each section in a target area.

The equipment density acquisition unit 1212 acquires a density at which equipment is installed (hereinafter, referred to as an "equipment density") for each section in a target area.

The lightning damage failure density acquisition unit 1213 acquires a frequency at which equipment has failed due to a lightning strike over the first period (hereinafter, referred to as a "lightning damage failure density" or a "failure density") for each section in a target area.

The regression analysis unit 1214 generates a regression equation representing a relationship between a lightning damage failure density for each section and a lightning strike density and an equipment density using an acquired lightning strike density and equipment density for each section in a target area as variables.

The prediction processing unit 122 includes a lightning strike density acquisition unit 1221, an equipment density acquisition unit 1222, and a prediction unit 1223.

The lightning strike density acquisition unit 1221 acquires a lightning strike density for each section in a prediction target area for a second period which is predetermined.

The equipment density acquisition unit 1222 acquires an equipment density for each section in a prediction target area.

The prediction unit 1223 predicts a lightning damage failure density for each section in a prediction target area corresponding to the second period on the basis of a lightning strike density for each section acquired by the lightning strike density acquisition unit 1221, an equipment density for each section acquired by the equipment density acquisition unit 1222, and a regression equation generated by the regression analysis unit 1214.

The ranking processing unit 123 imparts a risk rank representing the risk level of occurrence of a lightning damage failure in a specified section in a prediction target area on the basis of a lightning damage failure density for each section in the prediction target area which is predicted by the prediction unit 1223.

The mapping processing unit 124 creates a map including a specified section on the basis of section data stored in the section data storage unit 134. Then, the mapping processing unit 12 displays an index representing a risk rank imparted to the specified section, in association with a corresponding section on the map. In one embodiment, the mapping processing unit 124 further determines whether a risk rank is higher than a predetermined threshold value for each section. As a result, in a case where it is determined that the risk rank is higher than the threshold value, an index representing the type of a component of equipment having a risk of occurrence of a failure can be displayed in association with a corresponding section on the map.

Operation

Next, an information processing operation performed by the lightning damage prediction apparatus 1 configured as described above will be described.

(1) Generation of Regression Equation Using Regression Analysis

Figure 2:
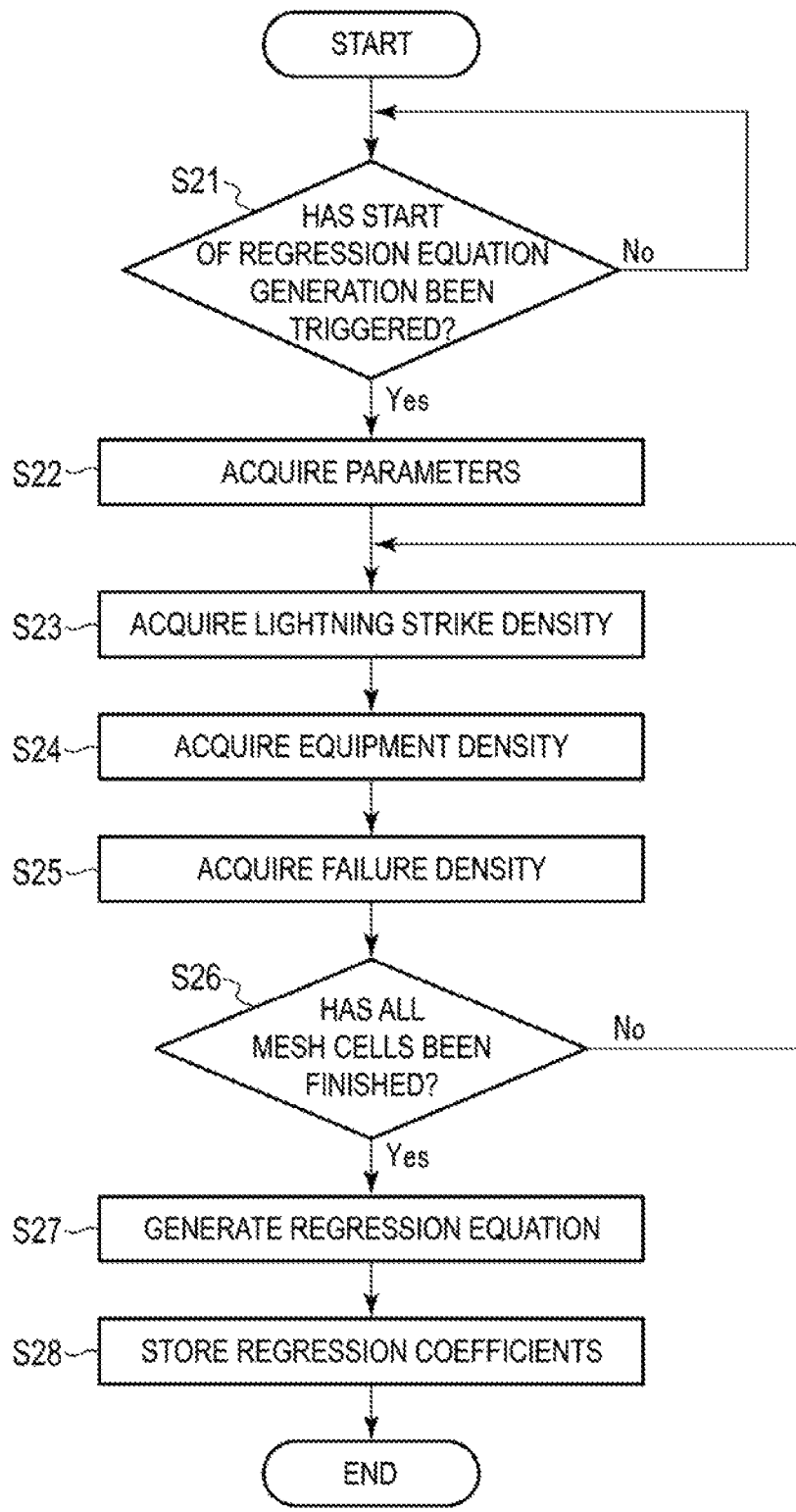
FIG. 2 is a flowchart illustrating an example of a regression analysis procedure performed by the lightning damage prediction apparatus illustrated in FIG. 1.

FIG. 2 is a flowchart illustrating a processing procedure and processing details of a regression equation generation process performed by the lightning damage prediction apparatus 1. In one embodiment, the lightning damage prediction apparatus 1 monitors the presence or absence of a trigger that starts the regression equation generation process in step S21. In this state, when, for example, a user inputs a generation request for a regression equation on the user terminal 2 and the user terminal 2 receives this generation request as a start trigger, the lightning damage prediction apparatus 1 executes a regression equation generation process as follows.

That is, the lightning damage prediction apparatus 1 first acquires parameters to be used for regression analysis from the user terminal 2 in step S22 under the control of the regression equation generation unit 121. The parameters include an analysis target period, an analysis target area, the type of equipment for acquiring an equipment density, and details of equipment for acquiring a failure density.

As the analysis target period which is one of the parameters acquired in step S22, data of which period is used for regression analysis is determined. For example, the analysis target period is specified as a period for regression analysis by a user through an input screen displayed on a display of the user terminal 2 as illustrated in FIG. 4A. FIG. 4B illustrates an example of a specified analysis target period. In the examples illustrated in FIGS. 4A and 4B, the analysis target period is specified as Jan. 1, 2017 to Sep. 1, 2017. Meanwhile, in FIGS. 4A and 4B, a prediction target period can be specified at the same time as the analysis target period, but the periods do not need to be specified at the same time. The prediction target period will be described later. In addition, the analysis target period and the prediction target period are not necessarily input manually by a human, and may be updated constantly so that a regression equation with high prediction accuracy can be obtained by machine learning.

The analysis target area, which is one of the parameters acquired in step S22, defines in what area unit a regression coefficient is derived. For example, the analysis target area is specified as a regression analysis unit by a user through an input screen displayed on the display of the user terminal 2 as illustrated in FIG. 5A. The analysis target area may be, for example, a prefectural area in units of prefectures, the whole country (Japan), or any other area. In addition, it is also possible to set the mesh cell size into which the analysis target area is divided to perform regression analysis. Here, the "mesh cell" refers to each of sections obtained by dividing a target area in a mesh form. FIG. 5A illustrates a case where a determination is made to perform analysis on both a 1 km square mesh cell and a 5 km square mesh cell for each prefectural region. FIG. 5B illustrates an example of images of a specified mesh cell size, an analysis target area, and a prediction target area. Meanwhile, a prediction target area will be described later.

Although FIGS. 5A and 5B illustrate a case where an analysis target area and a prediction target area are set at the same time, it is not necessary to set the areas at the same time, and the areas may be set separately on different screens. In addition, the mesh cell size, the analysis target area, and the prediction target area are not necessarily input by a human hand, and may be updated constantly so that a regression equation with high prediction accuracy can be obtained by machine learning.

Figure 6C:
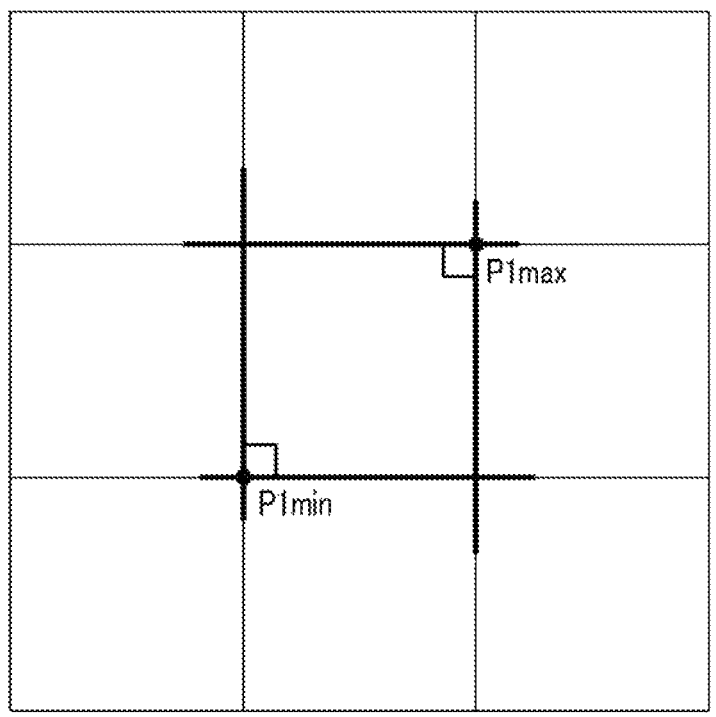
FIG. 6C is a diagram illustrating an example of a definition of a mesh cell using a latitude and a longitude.
Figure 6D:
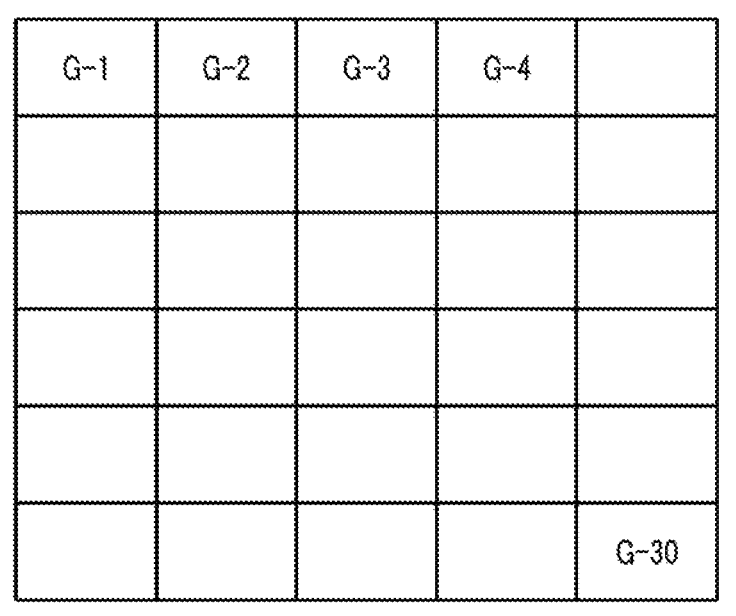

FIG. 6A illustrates data including positional information of a 1 km mesh cell as an example of section data stored in the section data storage unit 134. FIG. 6B illustrates data including positional information of a 5 km mesh cell as an example of section data stored in the section data storage unit 134. FIG. 6C illustrates an example of a definition of a mesh cell using a latitude and a longitude. In FIG. 6C, a certain mesh cell is defined by a point P1min having a minimum latitude and a minimum longitude, and a point P1max having a maximum latitude and a maximum longitude. FIG. 6D illustrates an example of a definition of an identification number imparted to a mesh cell. As illustrated in FIGS. 6A to 6D, each mesh cell is defined in advance by a minimum latitude, a minimum longitude, a maximum latitude, and a maximum longitude. It should be noted that the date and time, a latitude, a longitude, and specific numerical data are indicated by temporary numerical values or symbols throughout the drawings.

As for the type of equipment for acquiring an equipment density, which is one of the parameters acquired in step S22, the component of the access equipment for which an equipment density is acquired is specified. As the type of equipment, one or a plurality of types can be specified. For example, the type of equipment can be specified by a user through an input screen displayed on the display of the user terminal 2 as illustrated in FIG. 7, or may be updated constantly by machine learning. For example, it is conceivable to select a component having the largest amount of data in the equipment data stored in the equipment data storage unit 132.

As for the details of equipment for acquiring a failure density, which is one of the parameters acquired in step S22, the component of the access equipment, and the failure information for which a failure density is acquired is specified. For example, a user can specify one or a plurality of types of components through an input screen, which is not illustrated in the drawing, and specify the number of failed electrical poles, the length of a failed cable, and the like as units of failures. This will be described further below.

Next, in step S23, the lightning damage prediction apparatus 1 acquires a lightning strike density for each section corresponding to a specified analysis target period and analysis target area under the control of the lightning strike density acquisition unit 1211. The lightning strike density acquisition unit 1211 can also calculate a lightning strike density on the basis of lightning strike data stored in the lightning strike data storage unit 131 and section data stored in the section data storage unit 134, or can also read a lightning strike density from a database or the like which is not illustrated in the drawing.

In one embodiment, the lightning strike density acquisition unit 1211 extracts lightning strike data (the date and time of occurrence and the position of occurrence) corresponding to the specified analysis target period and analysis target area from the lightning strike data storage unit 131. Then, the number of lightning strikes having occurred for each section (that is, each of a 1 km square mesh cell or a 5 km square mesh cell) is counted on the basis of the section data stored in the section data storage unit 134, and a lightning strike density (the number of lightning strikes/$km^2$) can be calculated by dividing the number of lightning strikes by the area of each mesh cell. In addition, a lightning strike energy density [$A/km^2$], instead of the number of lightning strikes generated in each mesh cell, may be calculated by dividing, by the area of each mesh cell, a value obtained by adding up energies (for example, current values) of lightning strikes. FIG. 8 illustrates an example of lightning strike data stored in the lightning strike data storage unit 131. A lightning strike density acquired by the lightning strike density acquisition unit 1211 is stored in the section data storage unit 134 together with information for identifying a corresponding mesh cell.

Next, in step S24, the lightning damage prediction apparatus 1 acquires an equipment density for each section corresponding to the specified analysis target period, analysis target area, and type of equipment under the control of the equipment density acquisition unit 1212. The equipment density acquisition unit 1212 can also calculate an equipment density on the basis of the equipment data stored in the equipment data storage unit 132 and the section data stored in the section data storage unit 134, or can also read an equipment density from a database or the like which is not illustrated in the drawing.

In one embodiment, the equipment density acquisition unit 1212 extracts, from the equipment data storage unit 132, data of one or a plurality of types of components specified among pieces of equipment data in an analysis target area corresponding to the specified analysis target period. Then, the number of pieces of equipment included in each mesh cell is counted, and an equipment density (the number of pieces of equipment/$km^2$) is calculated by dividing the number of pieces of equipment by the area of each mesh cell. The equipment data stored in the equipment data storage unit 132 can include the types of components of access equipment and installation positions of the components. The types of components include devices and equipment such as electrical poles, connection terminal boxes, ground poles, manholes, communication cables, and cable support lines, and identification information representing the above-described types is stored in the equipment data storage unit 132.

The positions of a communication cable, a cable support line, and the like are defined by predetermined representative points such as a rising point (source node) of the communication cable, an end (destination node) of the communication cable, an intermediate point (intermediate node) of a communication cable route, and the like, and stored. Since positional information of access equipment such as a communication cable is rarely indicated by one point (latitude/longitude), an address (the names of municipalities, or the like) may be used as the positional information. Since an equipment density is used for analysis, equipment data may not include exact positional information. In addition, the number of electrical poles located in each mesh cell (or an area having any size) used in the calculation of an equipment density, the length of a communication cable, the length of a cable support line, and the like, instead of the individual locations of the access equipment, may be used as equipment data. In a case where there are a plurality of communication cables and support lines, a value obtained by adding up the lengths of communication cables and support lines may be used.

FIGS. 9A to 9C illustrate a conceivable example of a format of equipment data stored in the equipment data storage unit 132. In FIG. 9A, a latitude and a longitude are used as positional information of each component of the equipment. In FIG. 9B, municipal information is used as positional information of each component of the equipment. In FIG. 9C, the number of electrical poles that are present in a mesh cell, the length of a cable, and the length of a support line are used as positional information of each component of the equipment. The format of data is not limited thereto, and other formats can also be used. An equipment density acquired by the equipment density acquisition unit 1212 is stored in the section data storage unit 134 together with information for identifying a corresponding mesh cell.

Next, in step S25, the lightning damage prediction apparatus 1 acquires a lightning damage failure density for each section corresponding to a specified analysis target period and analysis target area under the control of the lightning damage failure density acquisition unit 1213. The type of access equipment and the unit of the number of failures for calculating a lightning damage failure density can be freely set by a user through a designation screen which is not illustrated in the drawing, or can also be updated constantly by machine learning.

The lightning damage failure density acquisition unit 1213 can also calculate a failure density for one or a plurality of types of components specified on the basis of the failure data stored in the failure data storage unit 133 and the section data stored in the section data storage unit 134, or can also read a failure density from a database or the like which is not illustrated in the drawing.

In one embodiment, the lightning damage failure density acquisition unit 1213 extracts data of one or a plurality of types of components specified among pieces of failure data in a target area from the failure data storage unit 133, and calculates the density of the equipment for each mesh cell. Specifically, for example, the lightning damage failure density acquisition unit 1213 first reads failure data of a component of a specified type for a specified period and a specified target area from the failure data storage unit 133. Next, lightning damage failures having occurred in each mesh cell are counted on the basis of the section data stored in the section data storage unit 134, and a lightning damage failure density [the number of lightning damage failures/ $km^2$] is calculated by dividing the number of lightning damage failures by the area of each mesh cell.

More specifically, the failure data stored in the failure data storage unit 133 includes the date and time of occurrence of a lightning damage failure of the access equipment, the position of occurrence of the lightning damage failure, and lightning damage failure information. Since the position of a lightning damage failure of the access equipment is rarely indicated by one point that can be indicated by a latitude and a longitude, an address (the names of municipalities, or the like), instead of a latitude and a longitude, may be used as positional information.

In a case where there is no detailed information of the access equipment (a failure of a communication cable, a failure of a support line, a failure of an electrical pole, and the like), the number of lightning damage failures (the number of electrical poles having failed due to lightning damage, the length of a lightning damage failure cable, the length of a lightning damage failure support line, and the like) that have occurred in each mesh cell (or an area having any size) used in the calculation of a lightning damage failure density can be used as information of the access equipment. In a case where the length of a cable is used, a lightning damage failure occurring somewhere in a cable having a predetermined length may be determined to be one failure. Furthermore, in a case where a plurality of lightning damage failures occur in the cable, such number may be used as the number of lightning damage failures. In a case where lightning damage failures have occurred in a plurality of communication cables and support lines, a value obtained by adding up the lengths of communication cables and support lines may be used. Furthermore, in a case where detailed information of the access equipment (a failure of a communication cable, a failure of a support line, a failure of an electrical pole, and the like) is not known, a lightning damage failure density may be calculated as the "access equipment" (that is, in units of access equipment). As an example, the number of reconstructions required in total for the entire access equipment in each area can also be used.

FIGS. 10A to 10E each illustrate an example of failure data stored in the failure data storage unit 133. FIGS. 10A and 10B illustrate a case where the date and time of occurrence of a failure and the position of occurrence of a failure are stored in units of access equipment. FIG. 10A illustrates an example in which the position of occurrence of a failure is represented by latitude and longitude information. FIG. 10B illustrates an example in which the position of occurrence of a failure is represented by address information of a municipality. FIGS. 10C and 10D illustrate a case where the date and time of occurrence of a failure and the position of occurrence of a failure are stored for each type of component. FIG. 10C is an example in which the position of occurrence of a failure is represented by latitude and longitude information. FIG. 10D is an example in which the position of occurrence of a failure is represented by address information of a municipality. FIG. 10E illustrates an example of failure data that stores a failure history for each mesh cell.

In this manner, a target for which the number of failures having occurred is counted may be the number of reconstructions required in total for the entire access equipment, may be the number of failures having occurred for each type of component, or may be the amount of damage occurring in a component such as a length, an area, or volume (also referred to as "the extent of damage") in acquiring a failure density. Consequently, the unit of a failure for counting the number of failures having occurred can be selected in a flexible manner depending on the state of damage.

Meanwhile, failure data is not limited to the data format illustrated in FIGS. 10A to 10E, and other data formats can be used. The lightning damage failure density acquired by the lightning damage failure density acquisition unit 1213 is stored in the section data storage unit 134.

The lightning damage prediction apparatus 1 repeats steps S23 to S25 mentioned above for all mesh cells in an analysis target area.

In step S26, the lightning damage prediction apparatus 1 determines whether a lightning strike density, an equipment density, and a failure density have been acquired for all mesh cells.

When a lightning strike density, an equipment density, and a failure density are acquired for all mesh cells in the analysis target area, the lightning damage prediction apparatus 1 generates a regression equation (that is, the derivation of a regression coefficient) in step S27 under the control of the regression analysis unit 1214. The regression analysis unit 1214 reads a lightning damage density, an equipment density, and a failure density for each mesh cell from the section data storage unit 134, and plots a lightning damage failure density on the vertical axis and (lightning strike density×equipment density) on the horizontal axis, for example, as illustrated in FIG. 11.

Figure 11:
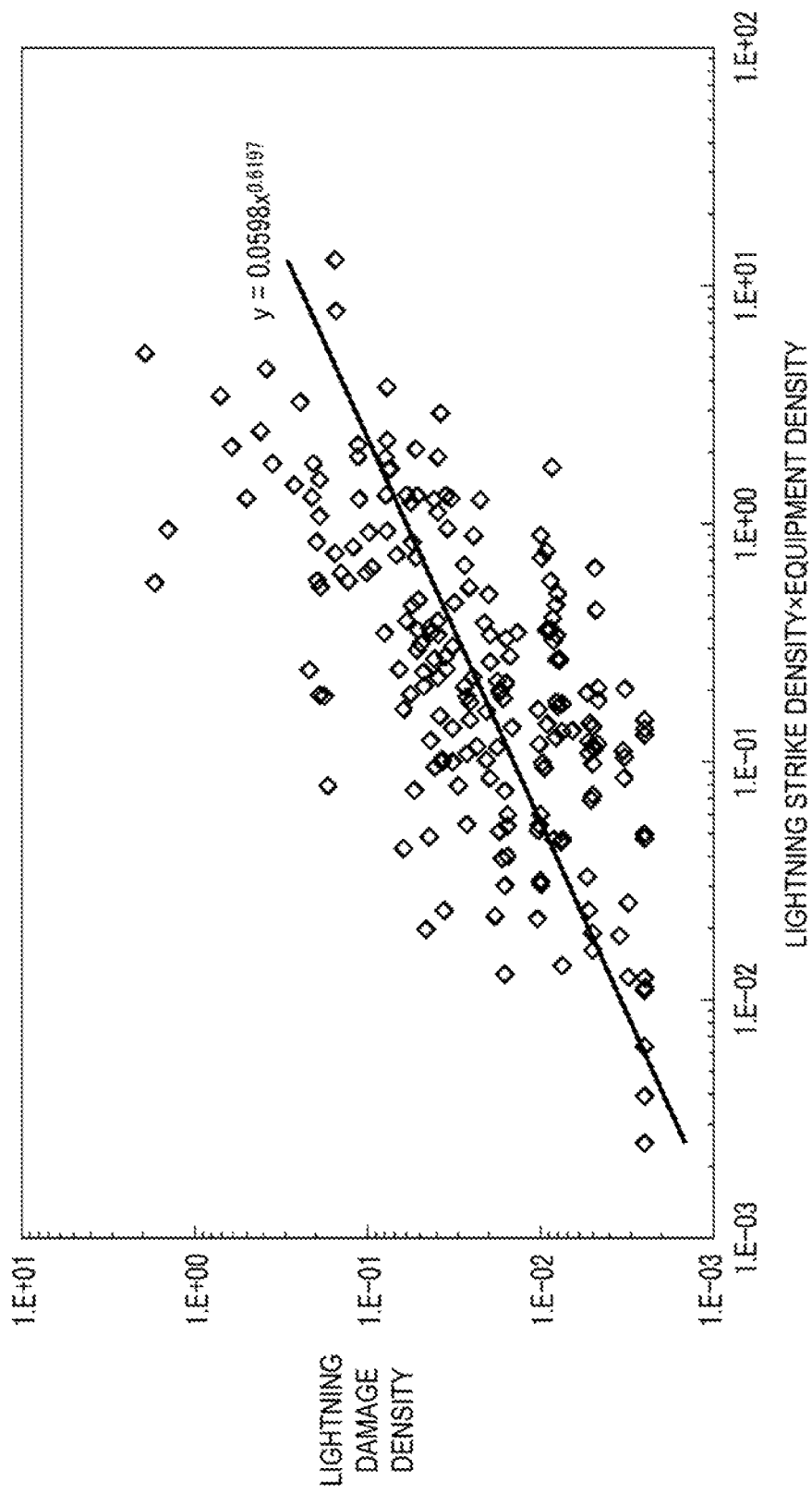
FIG. 11 is a diagram illustrating an example of a method of generating a regression equation.

Each plot in FIG. 11 corresponds to each section (each mesh cell). For example, a regression coefficient is derived for each prefectural region by plotting data of each mesh cell for each prefectural region, but a regression coefficient for any area can also be derived by performing plotting for the area. In the generation of a regression equation, regression coefficients A and B are derived on the assumption that plot points conform to the following equation (power regression analysis).

Lightning damage failure density=$A$(lightning strike density×equipment density)$^B$   Prediction Equation (i), where A and B are regression coefficients, and particularly, A is also referred to as a prediction coefficient and B is also referred to as a prediction index. Here, description is given using power regression analysis as regression analysis, but linear regression analysis or other regression analysis may also be used. Since a method using a computer is generally known as a method of deriving a regression coefficient, detailed will not be further described.

When the regression coefficients A and B are derived, the lightning damage prediction apparatus 1 stores the regression coefficients A and B in the section data storage unit 134 in step S28 under the control of the regression equation generation unit 121. FIG. 12 illustrates an example of section data stored in the section data storage unit 134, and includes a lightning strike density, an equipment density, and a lightning damage failure density which are acquired in units of a 1 km mesh cell for Gunma prefecture and Tokyo, and regression coefficients derived using the densities. Meanwhile, symbols and numerical values are examples, and are not limited thereto.

FIG. 12 illustrates only results derived using a 1 km mesh cell, but results using a 5 km mesh cell can also be stored together. In addition, one regression coefficient may also be derived for the whole country instead of a prefectural region. Furthermore, a regression coefficient may also be derived for an area as each local block such as Kanto or Kansai, instead of a prefectural region. A regression coefficient may be derived for a specific area, but a regression coefficient with the highest prediction accuracy may be adopted by causing a computer to derive regression coefficients for various areas. Prediction accuracy can be verified by performing commonly used examination by using data that have not been used in regression analysis. For example, evaluation using a determination coefficient $R^2$ (indicating that the closer the value is to 1, the higher the accuracy is) used in regression analysis and evaluation using a mean absolute error (MAE), a mean square error (MSE), and various examinations used in statistical processing are conceivable.

(2) Prediction of Lightning Damage Failure

Figure 3:
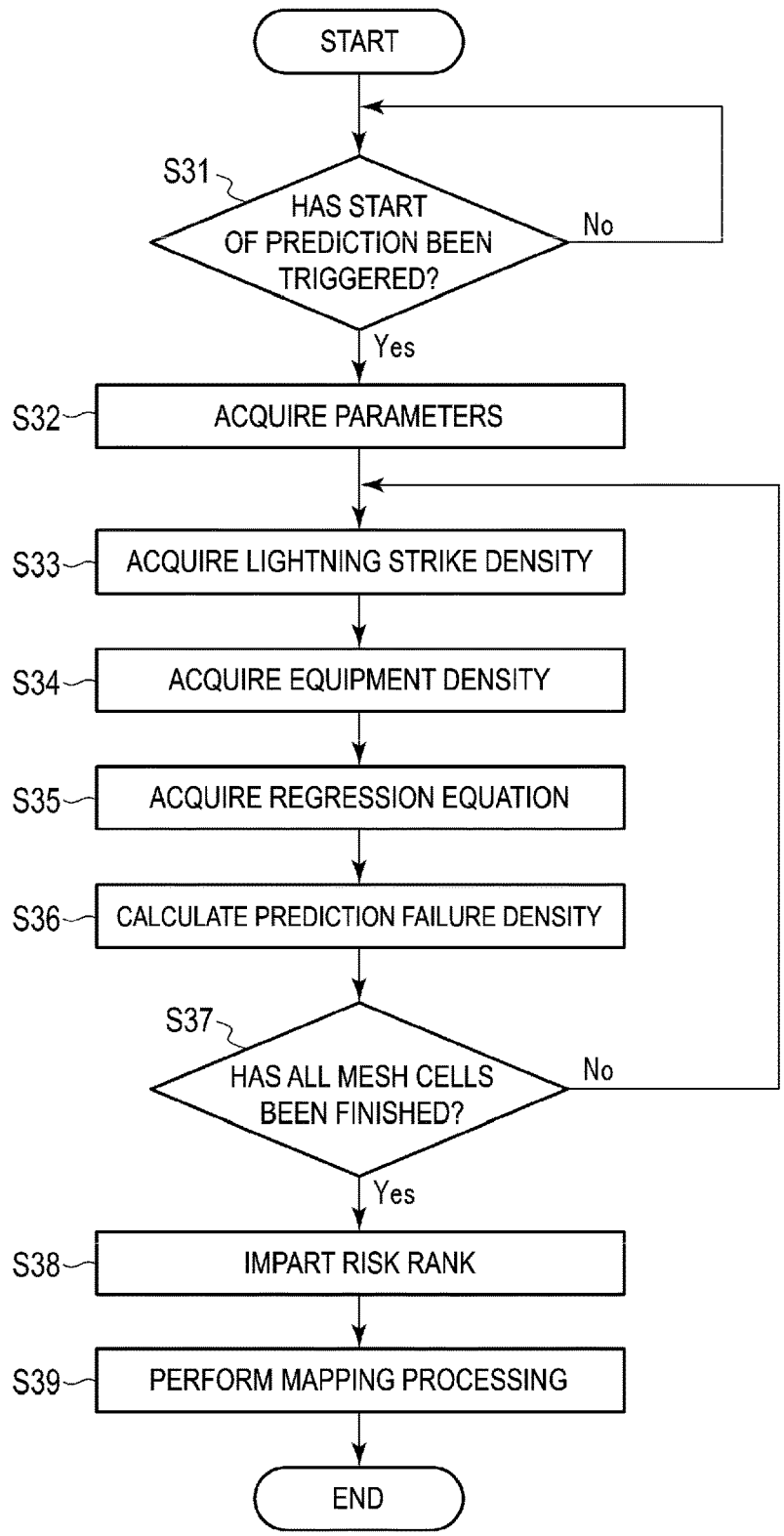
FIG. 3 is a flowchart illustrating an example of a prediction procedure performed by the lightning damage prediction apparatus illustrated in FIG. 1.

FIG. 3 is a flowchart illustrating a processing procedure and processing details for predicting a lightning damage failure by the lightning damage prediction apparatus 1.

Meanwhile, prediction processing may be executed following the above-described regression analysis process (that is, a regression equation may be derived every time prediction is performed), or may be executed at another timing after regression analysis is executed and a regression equation is stored in advance.

In one embodiment, the lightning damage prediction apparatus 1 monitors the presence or absence of a trigger for starting a prediction process in step S31. In this state, for example, when a user inputs a prediction processing request on the user terminal 2 and the prediction processing request is received as a starting trigger, the lightning damage prediction apparatus 1 executes the prediction processing as follows.

That is, the lightning damage prediction apparatus 1 first acquires parameters to be used for prediction in step S32 under the control of the prediction processing unit 122. The parameters include a prediction target period, a prediction target area, and the type of equipment for acquiring an equipment density.

As a prediction target period, which is one of the parameters acquired in step S32, data of which period is used for prediction processing (that is, for which period a lightning strike density and an equipment density that are substituted into Prediction Equation (i) are acquired) is specified. The prediction target period can be specified by a user through an input screen, for example, as illustrated in FIG. 4A. FIG. 4B illustrates an example of a specified prediction target period. In the example illustrated in FIGS. 4A and 4B, a case where the most recent three months (Oct. 1, 2017 to Dec. 31, 2017) are specified as a prediction target period is illustrated. Meanwhile, the prediction target period does not necessarily need to be set at the same time as an analysis target period.

As a prediction target area, which is one of the parameters acquired in step S32, an area for which a lightning damage failure is predicted (that is, for which area a lightning strike density and an equipment density that are substituted into Prediction Equation (i) are acquired) is specified. The prediction target area can be specified by a user through an input screen displayed on the display of the user terminal 2, for example, as illustrated in FIG. 5A. The prediction target area may be a mesh cell, a prefectural region, the whole country (Japan), or any other area. In FIG. 5A, the prediction target area is specified such that prediction is performed for both a 1 km square mesh cell and a 5 km square mesh cell for each prefectural region. The prediction target area may be the same as or different from an analysis target area. As described above, the analysis target area and the prediction target area do not necessarily need to be specified at the same time.

As the type of equipment for acquiring an equipment density, which is one of the parameters acquired in step S32, a component that, among the components included in the access equipment, is used as a prediction target is specified.

One or a plurality of types can be specified as the type of equipment. For example, the type of equipment can be specified by a user through an input screen displayed on the display of the user terminal 2 as illustrated in FIG. 13. The type of equipment used for prediction may be the same as or different from the type of equipment used for the regression analysis.

Next, in step S33, the lightning damage prediction apparatus 1 acquires a lightning strike density for each section corresponding to the specified prediction target period and prediction target area under the control of the lightning strike density acquisition unit 1221. The lightning strike density acquisition unit 1221 can also calculate a lightning strike density on the basis of the lightning strike data stored in the lightning strike data storage unit 131 and the section data stored in the section data storage unit 134, or can also read a lightning strike density from a database or the like which is not illustrated in the drawing.

In one embodiment, the lightning strike density acquisition unit 1221 extracts lightning strike data (the date and time of occurrence and the position of occurrence) corresponding to the specified prediction target period and prediction target area from the lightning strike data storage unit 131. Then, a lightning strike density [the number of lightning damage failures/km$^2$] can be calculated for each mesh cell on the basis of the section data stored in the section data storage unit 134. Similarly to the procedure of regression analysis, a lightning strike energy density [A/km$^2$] can also be acquired as a lightning strike density.

Next, in step S34, the lightning damage prediction apparatus 1 acquires an equipment density for each section corresponding to the specified prediction target area and type of equipment under the control of the equipment density acquisition unit 1222. The equipment density acquisition unit 1222 can also calculate an equipment density on the basis of the equipment data stored in the equipment data storage unit 132 and the section data stored in the section data storage unit 134, or can also read an equipment density from a database or the like which is not illustrated in the drawing. Data used for the acquisition of an equipment density in the prediction processing may be the latest equipment data, and may be data corresponding to the specified prediction target period (for example, a period average value or a maximum value).

In one embodiment, the equipment density acquisition unit 1222 extracts data of one or a plurality of types of components specified among the latest pieces of equipment data in a prediction target area from the equipment data storage unit 132 and calculates the density of the equipment for each mesh cell. Meanwhile, the equipment density may be the same as that used for the regression analysis, and may be separately acquired for the prediction procedure.

Next, in step S35, the lightning damage prediction apparatus 1 acquires a regression coefficient from the section data storage unit 134 under the control of the prediction processing unit 122. Next, in step S36, the lightning damage prediction apparatus 1 substitutes the acquired lightning strike density, equipment density, and regression coefficient into Prediction Equation (i) to calculate a failure density predicted for each mesh cell under the control of the prediction unit 1223. The number of failures predicted for each mesh cell is acquired by multiplying the calculated failure density by the area of the mesh cell.

The lightning damage prediction apparatus 1 repeats steps S33 to S36 for all mesh cells in the prediction target area.

In step S37, the lightning damage prediction apparatus 1 determines whether the prediction processing for all of the mesh cells has been terminated.

(3) Ranking Processing

When the prediction processing is terminated for all of the mesh cells in the prediction target area, the lightning damage prediction apparatus 1 imparts a risk rank based on the failure density or the number of failures acquired to each mesh cell in step S38 under the control of the ranking processing unit 123. The risk rank represents the risk level of occurrence of a failure in the access equipment due to lightning damage. For example, risk ranks of levels 1 to 5 can be imparted with the lowest risk being level 1 and the highest risk being level 5. In one example, level 1 can be defined as a prediction failure density of less than 10 cases/km$^2$, levels 2 as a prediction failure density of less than 20 cases/km$^2$, levels 3 as a prediction failure density of less than 50 cases/km$^2$, levels 4 as a prediction failure density of less than 80 cases/km$^2$, and level 5 as a prediction failure density of 80 cases/km$^2$ or greater.

The level indicating the risk rank can be freely set by a user through the input screen displayed on the display of the user terminal 2 as illustrated in FIG. 14A. FIG. 14A illustrates an example of a detailed setting screen for imparting a risk rank to a predicted failure density (display of the number of failures) as a level. FIG. 14A illustrates an example in which level 1 is set as 0 to 99 cases/km$^2$, level 2 as 100 to 199 cases/km$^2$, level 3 as 200 to 299 cases/km2, level 4 as 300 to 399 cases/km$^2$, and level 5 as 400 cases/km$^2$ or greater with a higher level value indicating a higher lightning damage risk. FIG. 14B illustrates specified risk rank levels. The lightning damage prediction apparatus 1 can store or output a risk rank, that is imparted for each mesh cell, in association with a mesh cell number for identifying the mesh cell.

(4) Mapping Processing

Next, in step S39, the lightning damage prediction apparatus 1 executes a mapping process of displaying prediction results on a map as follows under the control of the mapping processing unit 124.

Figure 15:
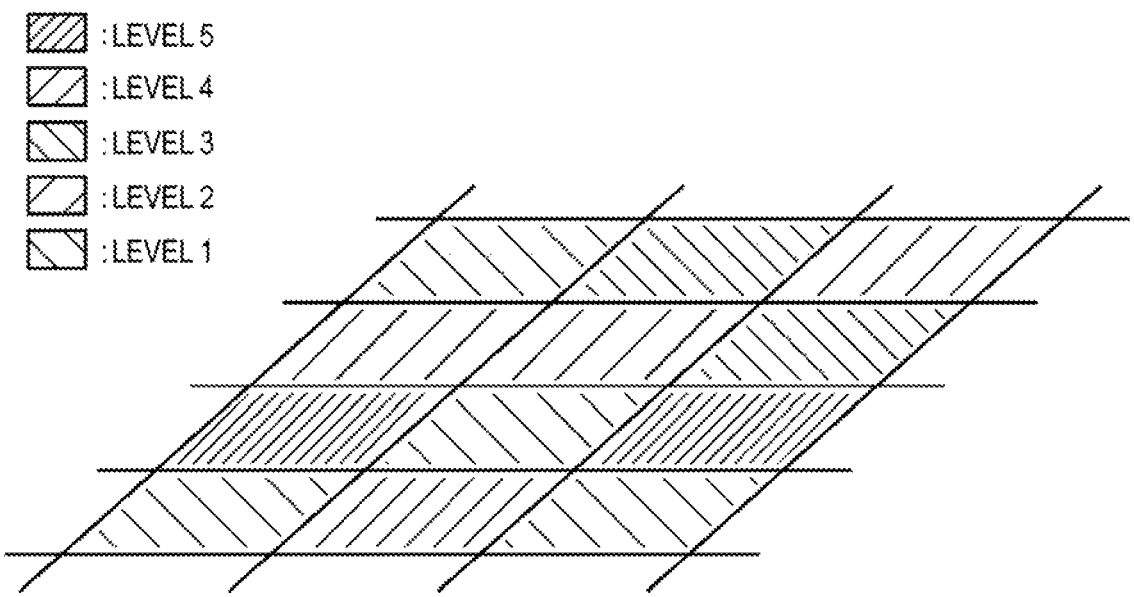
FIG. 15 is a diagram illustrating an example of mapping display that visually indicates a risk rank for each section.

That is, in one embodiment, first, the mapping processing unit 124 acquires a map including a prediction target area. The mapping processing unit 124 can also create a map on the basis of mesh cell information acquired from the section data storage unit 134, and can also acquire a map from a database which is not illustrated in the drawing. The mapping processing unit 124 displays an index representing an imparted risk rank in association with a corresponding mesh cell on the map. FIG. 15 illustrates an example in which a prediction target area is classified according to risk ranks. As illustrated in FIG. 15, drawing can be performed by performing coloring or pattern processing specified in advance depending on a risk rank for each mesh cell.

Further, in one embodiment, the mapping processing unit 124 may map some index to a mesh cell corresponding to a risk rank of a level exceeding a predetermined threshold value. For example, the mapping processing unit 124 includes a risk rank determination unit and a display data generation unit. Then, the risk rank determination unit determines whether a risk rank for each mesh cell is higher than a predetermined threshold value. As a result, in a case where it is determined that the level of a risk rank is higher than a threshold value, the display data generation unit generates display data for displaying a determination result of the risk level. For example, the display data generation unit generates display data for displaying, in association with a corresponding mesh cell on the map, an index representing the type of component of the equipment having a risk of occurrence of a failure.

Figure 16:
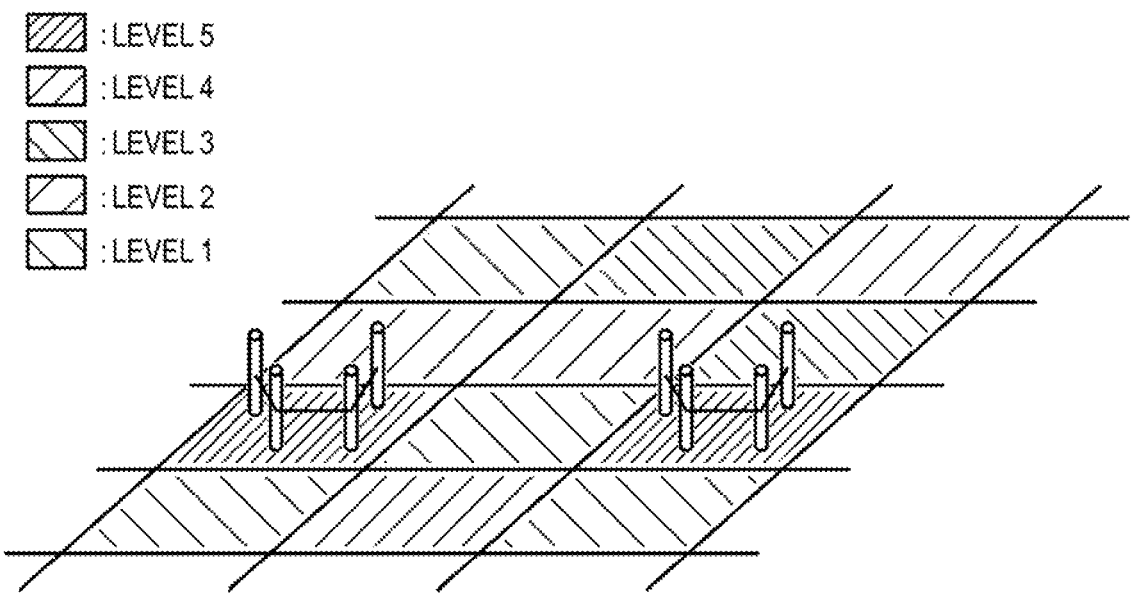
FIG. 16 is a diagram illustrating an example of mapping display in which representations representing components are superimposed on a high risk rank section.

FIG. 16 illustrates an example of such mapping, and an image of electrical poles is drawn in a mesh cell corresponding to level 5 having the highest risk rank as an example of an index representing the type of component of the equipment having a risk of occurrence of a failure. The index displayed on the map may be any index. For example, the index may be freely specified by a user through an input screen which is not illustrated in the drawing, or the index may represent the type of equipment acquired in step S32. As a result, a mesh cell having a high risk of occurrence of a failure in the access equipment due to lightning damage, and a component which is present in the mesh cell can be easily visually identified.

Effect

As described above in detail, in one embodiment of the disclosure, a regression equation is generated that represents a relationship between a lightning strike density and an equipment density for each section and a lightning damage failure density for each section which correspond to a predetermined analysis target period and an analysis target area. In particular, it is assumed that data of one or a plurality of types of components freely selected from among the components included in the access equipment is used when an equipment density is acquired. Furthermore, data of one or a plurality of types of components freely selected from among the components included in the access equipment is used when a lightning damage failure density is acquired. Furthermore, the unit of a failure for counting the number of failures in each section can be freely selected.

Consequently, according to one embodiment, data can be collected in a flexible manner for an analysis target area even in a case where detailed lightning damage failure data of the access equipment is not acquired and a prediction technique in the related art cannot be applied. Furthermore, regression analysis can be performed on the entire access equipment using only available information. In particular, the types of components and the unit of a failure used to acquire a failure density can be freely set, and thus analysis can be performed using available information more effectively. In this manner, the prediction of a lightning damage failure by a communication apparatus in the related art can be applied to the prediction of a lightning damage failure for the entire access equipment including components of a plurality of types.

In addition, according to one embodiment, a lightning damage failure density is predicted on the basis of a lightning strike density and an equipment density for each section corresponding to a predetermined prediction target period and a prediction target area, and an obtained regression equation. Similarly to a regression analysis process, the types of components can be freely selected when an equipment density is acquired. Therefore, even in a case where a prediction technique in the related art cannot be applied, a lightning damage failure can be predicted for the entire access equipment using only available information.

According to one embodiment, a rank is imparted for each section on the basis of the risk level of occurrence of a lightning damage failure, and thus it is possible to easily recognize a section having a high risk of occurrence of a lightning damage failure and to devise a necessary countermeasure. Furthermore, it becomes easy to visually grasp a lightning damage failure risk by displaying a rank imparted for each section on a map. Additionally, it is possible to more easily recognize a section having a high risk of occurrence of a lightning damage failure in a prediction target area by using a visual mark corresponding to a risk rank such as color coding. Furthermore, for a section having a particularly high risk rank, an area and equipment for which countermeasures should be devised can be recognized at a glance by displaying components having a risk of occurrence of a lightning damage failure on a map.

Other Embodiments

The disclosure is not limited to the above-described embodiment. For example, in the above-described embodiment, description has been given on the assumption that a user specifies various parameters, but the parameters may be specified using an algorithm for performing prediction processing using various parameters and selecting a parameter having high prediction accuracy on the basis of past results. For example, optimal parameters may be determined using a program such as machine learning.

Thus, even in a case where sufficient actual measurement data regarding a failure of equipment for which a lightning damage failure prediction is desired is not collected, more appropriate failure prediction results can be acquired by selecting optimal parameters.

Further, in the above-described embodiment, Prediction Equation (i) is used for regression analysis (single regression analysis), but in a case where detailed data regarding components can be acquired, regression analysis can also be performed using the following Prediction Equation (ii) using a plurality of components of data (multiple regression analysis).

Lightning failure density=$A_1$(lightning strike density×electrical pole density)$^{B_1}$+$A_2$(lightning strike density×communication cable density)$^{B_2}$+ $A_3$(lightning strike density×cable support line density)$^{B_3}$   Prediction equation (ii)

Meanwhile, $A_1$, $A_2$, $A_3$, $B_1$, $B_2$, and $B_3$ are regression coefficients. According to Prediction equation (ii), it is possible to perform regression analysis that better reflects the state of the actual lightning damage failure using actual measurement data of each of a plurality of components of the access equipment. In addition, it is also expected that prediction accuracy is greatly improved by Prediction Equation (ii).

Further, in the above-described embodiment, power regression analysis has been used, but linear regression analysis may also be used. Thus, simple and rapid analysis and prediction processing are realized using simpler computational processing.

Thus, in the disclosure, a regression analysis technique can be appropriately selected by a user.

Furthermore, in the above-described embodiment, a prediction model using a regression equation has been described, but the prediction model is not limited thereto. It is also conceivable to perform prediction using a neural network model trained using a wide variety of lightning damage failure data.

Further, in the above-described embodiment, description has been given on the assumption that separate functional units (the lightning strike density acquisition unit 1211 and the lightning strike density acquisition unit 1221) execute a process of acquiring a lightning strike density used to generate a regression equation and a process of acquiring a lightning strike density used for prediction processing, but a single functional unit may execute the processes. The same applies to the acquisition of an equipment density (the equipment density acquisition unit 1212 and the equipment density acquisition unit 1222) used for the generation of a regression equation generation and prediction processing.

In addition, a method of outputting prediction results including mapping can be modified and implemented in various ways without departing from the scope of the invention.

In short, the disclosure is not limited to the above-described embodiment as it is, and can be embodied with the components modified without departing from the scope of the disclosure when implemented. Furthermore, various inventions can be formed by appropriate combinations of a plurality of components disclosed in the above-described embodiment. For example, several components may be deleted from all of the components illustrated in the embodiment. Furthermore, components of different embodiments may be appropriately combined with each other.

REFERENCE SIGNS LIST

1 . . . lightning damage prediction device
2 . . . User terminal
11 . . . Input/Output interface unit
12 . . . Processing unit
13 . . . Storage unit
121 . . . Regression equation generation unit
122 . . . Prediction processing unit
123 . . . Ranking processing unit
124 . . . Mapping processing unit
131 . . . Lightning strike data storage unit
132. Equipment data storage unit
133 . . . Failure data storage unit
134 . . . Section data storage unit
171 . . . Electrical pole
172 . . . Communication cable
173 . . . Cable support line
174 . . . Cable ring
175 . . . Connection terminal box
176 . . . Ground electrode
177 . . . Manhole
1211 . . . Lightning strike density acquisition unit
1212 . . . Equipment density acquisition unit
1213 . . . Lightning damage failure density acquisition unit
1214 . . . Regression analysis unit
1221 . . . Lightning strike density acquisition unit
1222 . . . Equipment density acquisition unit
1223 . . . Prediction unit

The invention claimed is:

1. A lightning damage prediction apparatus for acquiring data from, a lightning strike data storage unit that stores lightning strike data including a position of occurrence of a lightning strike and a date and time of occurrence; an equipment data storage unit that stores equipment data representing a property of each of a plurality of types of components constituting equipment; a failure data storage unit that stores failure data representing a history of failures having occurred in the equipment or each of the components of the equipment due to the lightning strike; and a section data storage unit that stores section data including positional information of each of a plurality of sections obtained by dividing a prediction target area, the lightning damage prediction apparatus comprising:
a processor; and
a storage medium having computer program instructions stored thereon, wherein the computer program instructions, when executed by the processor, perform to:
generate a regression equation representing a relationship between a lightning damage failure density for each section in the prediction target area corresponding to a first period and a lightning strike density and an equipment density based on the failure data and the section data using, as variables, the lightning strike density for each section in the prediction target area corresponding to the first period in the past based on the lightning strike data and the section data and the equipment density for each section in the prediction target area corresponding to the first period based on the equipment data and the section data;
acquire the lightning strike density and the equipment density for each section in the prediction target area corresponding to a second period that is a prediction target; and
predict the lightning damage failure density for each section in the prediction target area corresponding to the second period on the basis of the acquired lightning strike density and the equipment density and the regression equation:

$$\text{lightning damage failure density} = A(\text{lightning strike density} \times \text{equipment density})^B,$$

where A is a prediction coefficient and B is a prediction index.

2. The lightning damage prediction apparatus according to claim 1, wherein the computer program instructions further perform to:
store, as the failure data, at least one of the number of failures, which occurs in the equipment due to the lightning strike, for each type of component, or an extent of damage for each type of component; and
to obtain the lightning damage failure density for each section in the prediction target area corresponding to the first period, on the basis of at least one of the number of failures having occurred for each type of component of the equipment or the extent of damage for each type of component, which are stored as the failure data, and the section data.

3. The lightning damage prediction apparatus according to claim 1, wherein the computer program instructions further perform to:
impart a risk rank representing a risk level of occurrence of a lightning damage failure in a specified section in the prediction target area on the basis of the predicted lightning damage failure density for each section in the prediction target area.

4. The lightning damage prediction apparatus according to claim 1, wherein the computer program instructions further perform to:
create a map including the specified section on the basis of the section data and display, in association with a corresponding section on the map, an index representing a risk rank imparted to the specified section.

5. The lightning damage prediction apparatus according to claim 4, wherein the computer program instructions further perform to:
determine whether the risk rank is higher than a predetermined threshold value for each of the sections; and
generate display data for displaying an index representing the type of component of equipment having a risk of occurrence of a failure in association with the corresponding section on the map in a case where it is determined that the risk rank is higher than the predetermined threshold value.

6. The lightning damage prediction apparatus according to claim 1, wherein the computer program instructions further perform to:

update, by a machine learning process, at least one of the first period, the prediction target area, a size of each of the sections, a type of component used for calculation of the equipment density, or a type of component used for calculation of the lightning damage failure density, which are used to generate the regression equation.

7. A lightning damage prediction method for acquiring data from, a lightning strike data storage unit that stores lightning strike data including a position of occurrence of a lightning strike and a date and time of occurrence; an equipment data storage unit that stores equipment data representing a property of each of a plurality of types of components constituting equipment; a failure data storage unit that stores failure data representing a history of failures having occurred in the equipment or each of the components of the equipment due to the lightning strike; and a section data storage unit that stores section data including positional information of each of a plurality of sections obtained by dividing a prediction target area, the lightning damage prediction method comprising:

generating a regression equation representing a relationship between a lightning damage failure density for each section in the prediction target area corresponding to a first period and a lightning strike density and an equipment density based on the failure data and the section data using, as variables, the lightning strike density for each section in the prediction target area corresponding to the first period in the past based on the lightning strike data and the section data and the equipment density for each section in the prediction target area corresponding to the first period based on the equipment data and the section data;

acquiring the lightning strike density and an equipment density for each section in the prediction target area corresponding to a second period that is a prediction target; and predicting the lightning damage failure density for each section in the prediction target area corresponding to the second period on the basis of the acquired lightning strike density and equipment density and the regression equation:

$$\text{lightning damage failure density} = A(\text{lightning strike density} \times \text{equipment density})^B,$$

where A is a prediction coefficient and B is a prediction index.

* * * * *